United States Patent [19]

Borzakian

[11] Patent Number: 5,051,285

[45] Date of Patent: Sep. 24, 1991

[54] PLASTIC PILING

[75] Inventor: Vartkes Borzakian, Glendale, Calif.

[73] Assignee: Pillard Products, Inc., Glendale, Calif.

[21] Appl. No.: 407,574

[22] Filed: Sep. 15, 1989

Related U.S. Application Data

[63] Continuation-in-part of Ser. No. 226,138, Jul. 29, 1988, abandoned.

[51] Int. Cl.⁵ .............................................. E02D 5/60
[52] U.S. Cl. ................................. 428/36.4; 138/143; 405/211; 428/35.8; 428/36.91
[58] Field of Search .................... 405/211, 216, 231; 428/34.5, 35.8, 36.91, 36.5, 36.4; 138/143

[56] References Cited

U.S. PATENT DOCUMENTS

| Re. 31,354 | 8/1983 | Eckner | 138/131 |
|---|---|---|---|
| 3,200,554 | 7/1963 | Goodman et al. | 52/727 |
| 3,253,066 | 5/1966 | Hardy et al. | 264/51 |
| 3,306,960 | 2/1967 | Weissman et al. | 264/54 X |
| 3,342,913 | 9/1967 | Engel | 264/54 X |
| 3,425,092 | 2/1969 | Taga | 264/323 X |
| 3,528,458 | 9/1971 | Gaeckel | 264/46.9 X |
| 3,606,635 | 9/1971 | Benteler et al. | 264/46.9 X |
| 3,611,736 | 10/1971 | Goodman | 405/231 |
| 3,619,436 | 11/1971 | Gruss et al. | 264/51 X |
| 3,736,759 | 6/1973 | Blose | 61/54 |
| 3,922,828 | 12/1975 | Patton | 52/368 |
| 3,978,181 | 8/1976 | Vahle | 264/279.1 X |
| 3,993,265 | 11/1976 | Parks | 264/45.5 X |
| 4,141,951 | 2/1979 | Beckman | 264/271.1 X |
| 4,146,562 | 3/1979 | Fukushima et al. | 428/35.8 |
| 4,187,352 | 2/1980 | Klobbie | 264/45.3 X |
| 4,323,528 | 4/1982 | Collins | 264/323 X |
| 4,351,786 | 9/1982 | Mueller | 264/271.1 X |
| 4,485,057 | 11/1984 | Kristensson et al. | 264/45.7 |
| 4,604,250 | 8/1986 | Ecker | 264/35 |
| 4,606,953 | 8/1986 | Suzuki et al. | 428/36 |
| 4,626,189 | 12/1986 | Hammer et al. | 425/146 |
| 4,629,597 | 12/1986 | Charlebois et al. | 264/278 |
| 4,708,527 | 11/1987 | Inhofe, Jr. et al. | 405/216 |
| 4,725,165 | 2/1988 | Langran | 264/271.1 X |
| 4,738,808 | 4/1988 | Hammer et al. | 264/40.1 |
| 4,743,142 | 5/1988 | Shiraishi et al. | 405/216 |
| 4,762,584 | 8/1988 | Andreasen et al. | 156/245 |
| 4,797,237 | 1/1989 | Hammer et al. | 264/45.3 |
| 4,818,148 | 4/1989 | Takeda et al. | 405/231 |
| 4,824,627 | 4/1989 | Hammer et al. | 264/211.21 |

FOREIGN PATENT DOCUMENTS

| 47-27783 | 7/1972 | Japan | 264/271.1 |
|---|---|---|---|
| 61-14920 | 1/1986 | Japan | 264/271.1 |
| 61-88092 | 5/1986 | Japan | 264/271.1 |

OTHER PUBLICATIONS

Letter dated 8/6/86 from officials of Los Angeles Harbor.
Letter dated 7/30/87 from officials of Los Angeles Harbor.

*Primary Examiner*—James J. Seidleck
*Attorney, Agent, or Firm*—Denton L. Anderson

[57] ABSTRACT

As structural plastic pipe has an outer diameter of at least 10 inches and is suitable for use as a plastic piling. The pipe is at least 10 feet long and comprises an inner pipe core of no more than 6 inches in diameter. There is an outer, extruded, continuous, substantially homogeneous plastic layer at least two inches thick on substantially the entire length of the steel core. The plastic layer comprises low density polyethylene, high density polyethylene, polypropylene, foaming agent, and antioxidant, as well as a synergist for the antioxidant. The plastic layer is extruded directly onto the pipe core in a single extruding operation. A die head can be used for imparting rotational motion to an extruded plastic composition before it is introduced into a mold used for forming the plastic pipe to make certain that the entire mold is filled with the plastic composition.

8 Claims, 3 Drawing Sheets

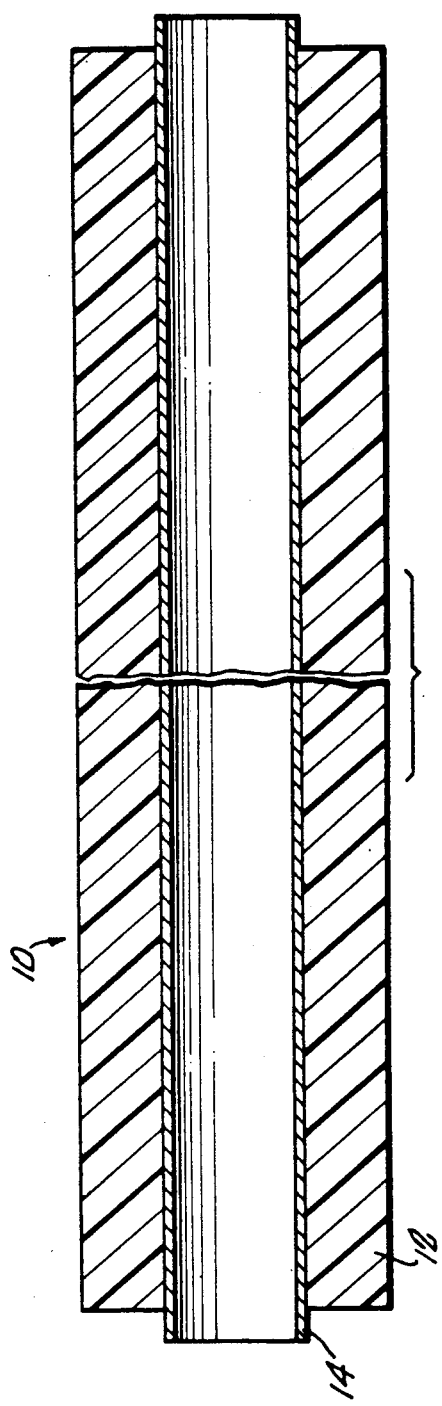
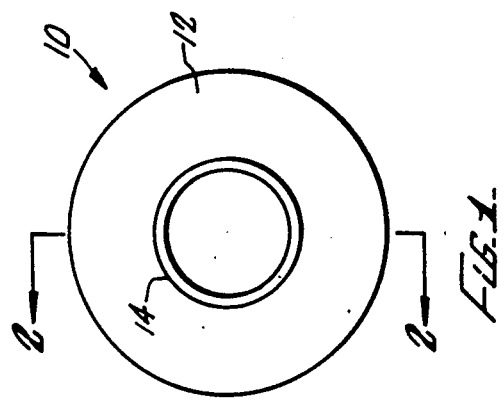
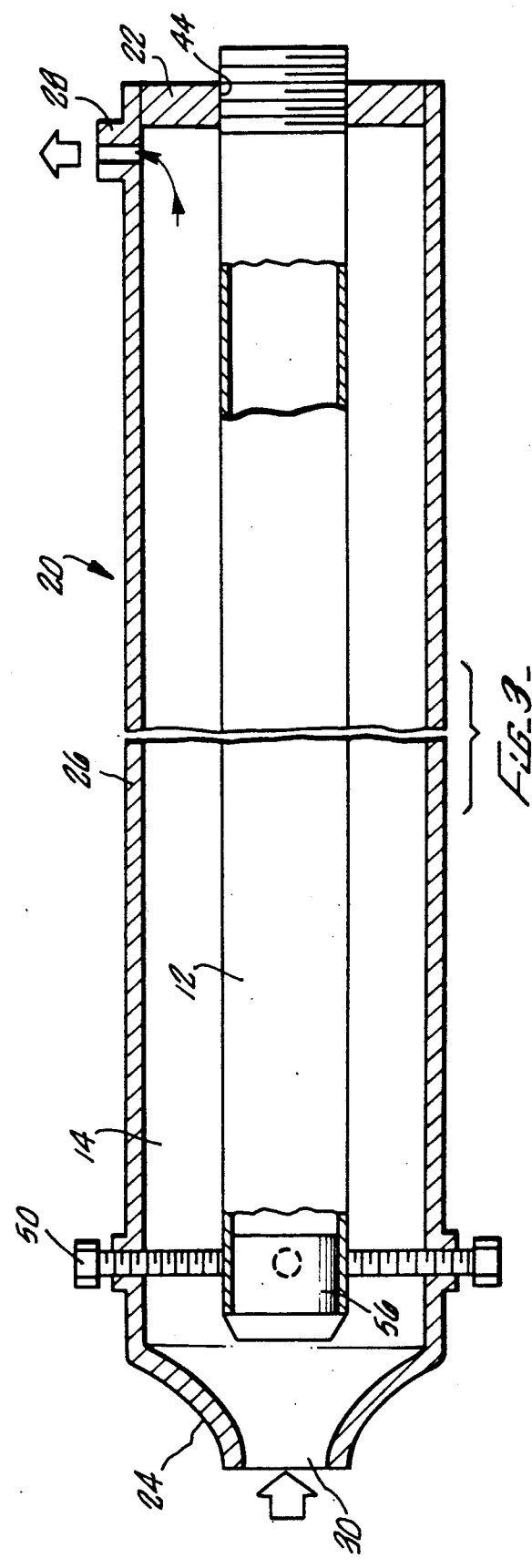

PLASTIC PILING

CROSS-REFERENCE

This application is a continuation-in-part of application Ser. No. 226,138 filed on July 29, 1988, now abandoned, which is incorporated herein by this reference.

BACKGROUND

The present invention relates to an elongated plastic member which can be used as a piling.

Concrete, steel, and wood are conventionally used for pilings, telephone poles, and the like. However each of these materials has disadvantages. Concrete and steel pilings are heavy and awkward to maneuver. Neither concrete nor steel pilings make good fender pilings because neither is "forgiving" when impacted. Under impact steel bends and buckles and concrete shatters. Both concrete and steel pilings are expensive to repair. Furthermore, steel, either standing alone or as a reinforcement in porous concrete, is subject to corrosion. Due to the weight of steel pilings, they can be difficult to transport.

Wood pilings are plagued by wear and tear and are attacked by wood boring marine organisms. Wood pilings are typically treated with creosote, but even this material can be ineffective against modern marine borers. These marine borers can only be stopped by wrapping the wood pilings in plastic coverings. However these plastic coverings cannot withstand much wear and tear, especially abrasion from normal vessel contact. So in addition to a thin plastic wrap, wooden fender piles often require thick plastic wrappings, which are expensive to put in place.

When wood is used for telephone poles, the poles are subject to attack from the environment. Woodpeckers love telephone poles, and in desert locations, telephone poles are subject to severe erosion from sandstorms.

In view of these problems with conventional pilings and telephone poles, there is a need for pilings and telephone poles that have a long life, are easily installed, environmentally sound, and durable in use.

SUMMARY

This need is satisfied by an elongated structural plastic member according to the present invention. The member has an outer diameter of at least 10 inches and is suitable for use as a plastic piling, telephone pole, and the like. The member is at least 10 feet long and comprises an inner core, generally metallic that is at least 3 inches in diameter and an outer foamed plastic layer that is at least 2 inches thick. The plastic layer is extruded, continuous, and substantially homogeneous. It extends substantially the entire length of the core, although one or both ends of the core can extend out from the plastic coating for joining two plastic members together. The plastic layer comprises low density polyethylene, high density polyethylene, polypropylene, blowing or foaming agent, and antioxidant. A typical plastic member has an outer diameter of 13 inches, with the plastic layer being at least 4 inches thick, and the core being no more than 5 inches in diameter.

The plastic member can have at least about 25 pounds, and typically about 35 pounds of plastic per linear foot. Thus a 20 foot long piling can have at least about 500 pounds of plastic, and typically at least 750 pounds of plastic.

In a preferred version, the plastic layer comprises, based on the weight of the plastic components of the layer, from about 20% to about 25% low density polyethylene, more preferably about 20%, from about 20% to about 50% high density polyethylene, more preferably about 40%, and from about 35% to about 55% polypropylene, more preferably about 40%. The plastic composition can comprise a filler such as calcium carbonate.

The plastic member can be formed by supporting the core inside a mold and extruding the plastic composition with an extruder into the mold and around the core so that the core is substantially completely embedded in the plastic composition. The extruded plastic is allowed to cool and the formed plastic member is then removed from the mold. The core is typically hollow, generally a steel pipe, for savings in material costs and convenience in use.

The plastic member so formed is unique in that the plastic material itself is a structural element, rather than the metal core. It overcomes disadvantages of prior art concrete, steel, and wood pilings, and has some unique benefits as described in detail below. For example plastic pilings can be floated into place and thus are much easier to handle and transport than metal pilings. They can also be made aesthetically pleasing, by including in the plastic a colorant.

The extruder can be provided with a die head that includes a transition section and a mixing section. The transition section is adapted for connection to the discharge of the extruder for receiving the molten plastic composition from the extruder. The mixing section has an entrance connected to the transition section, a peripheral wall, longitudinal axis, and a plurality of longitudinally extending vanes projecting radially inwardly from the peripheral wall. These vanes impart rotational motion to the resin passing through the mixing section. The mixing section also has an outlet for feeding the rotating molten thermoplastic resin into the mold. Because of the rotational motion of the resin, the walls of the mold are completely covered with the plastic composition and the mold can be completely filled. This is true even where the diameter of the mold is three times or more larger than the diameter of the outlet from the mixing section.

Preferably the diameter of the entrance to the mixing section is less than the diameter of the outlet from the mixing section to prevent resin from being pressured back into the transition section.

The mixing section is generally ellipsoidal in shape, and preferably has a prolate ellipsoid shape.

The vanes which provide the rotational motion generally extend along the length of the mixing section, projecting into the mixing section from the peripheral wall at a maximum in the center of the mixing section and at a minimum at the entrance and outlet.

In addition, each vane extends along an arcuate segment of the peripheral wall of the mixing section, with the distance each vane projects from the peripheral wall varying along the segment. Preferably there are four vanes, each occupying a 90° segment of the peripheral wall.

BRIEF DESCRIPTION OF DRAWINGS

These and other features, aspects, and advantages of the present invention will become better understood with reference to the following description, appended claims, and accompanying drawings where:

FIG. 1 is an end view of a plastic piling according to the present invention;

FIG. 2 is a vertical sectional view of the piling of FIG. 1 taken on line 2—2 in FIG. 1;

FIG. 3 is a schematic view of an assembly useful for fabricating the plastic piling of FIG. 1;

DESCRIPTION

Figure 4:
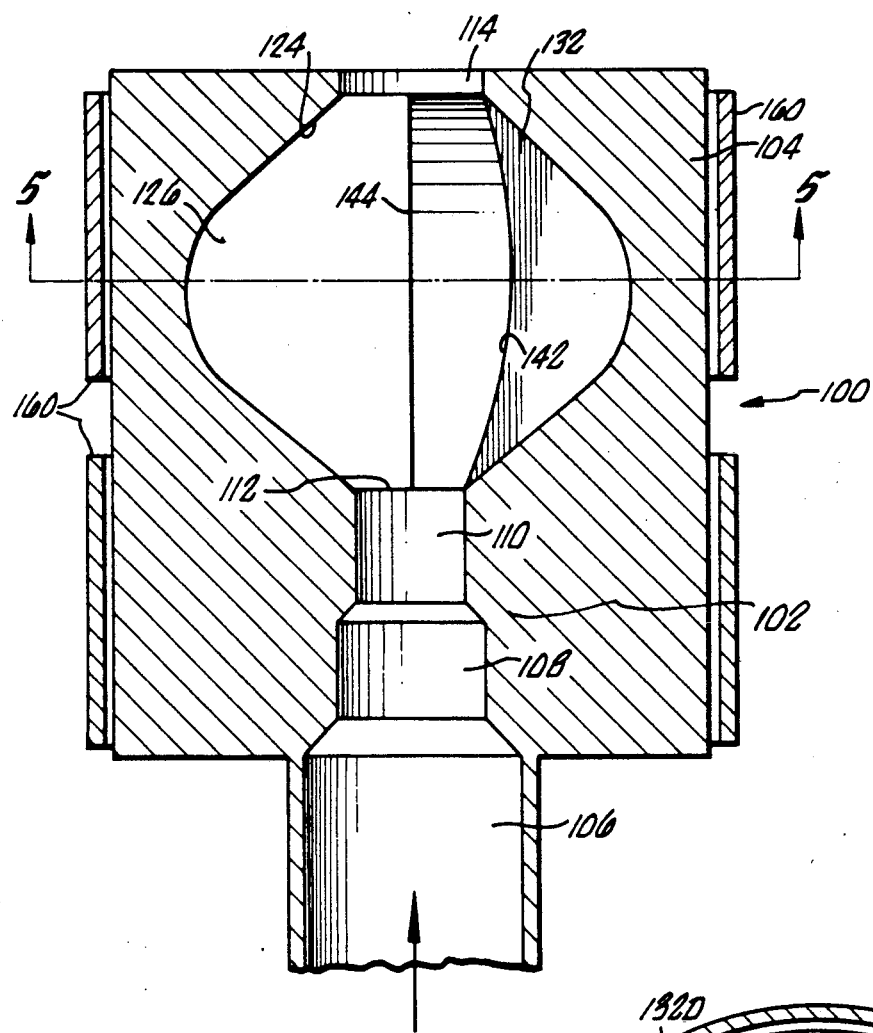
FIG. 4 is a longitudinal sectional view of a die head suitable for use with an extruder for making plastic members in accordance with the present invention.

The present invention provides a novel plastic member or pipe that has sufficient structural strength that it can serve as a plastic piling, telephone pole, or other structural element. As shown in FIGS. 1 and 2, a plastic pipe or piling 10 according to the present invention has only two components. It comprises a core 12 and an outer foamed plastic layer 14 extruded around the core 12.

The core 12 can be made of substantially any material, including metals and plastics. Generally it is formed of a rigid material, and for convenience, typically steel. The core 12 can be hollow or solid. Preferably it is hollow for reduced weight and cost. Accordingly the plastic member 10 will generally be referred to herein as a plastic pipe or piling. Since it is the foamed plastic layer 14 that provides the bulk of the structural strength of the plastic pipe 10, the particular material and properties of the pipe core 12 are not critical, just as long as the core provides the "mandrel" or the like around which the plastic layer 14 is extruded and it does not deleteriously affect the properties of the plastic layer 14.

The plastic layer is made of a unique combination of plastic materials and additives. The plastic material comprises low density polyethylene, high density polyethylene, and propylene. The essential additives are an antioxidant and a foaming agent. Optional additives include a UV inhibitor, filler, fungicide, coupling agent, emulsifier, and a synergist for the antioxidant.

The amount of the different plastic components used is a compromise between flexibility, brittleness, and impact resistance. If the composition contains too much polyethylene, it becomes too flexible for use as a piling, but if it contains too little polyethylene, it becomes too brittle. Accordingly, preferably the composition contains at least 40% polyethylene, at least 20% low density polyethylene, and at least 20% high density polyethylene. All percentages used herein are percentages by weight based upon the weight of the polymeric components of the plastic composition, namely the polyethylene and polypropylene.

If the composition contains too much low density polyethylene, it is too flexible. Accordingly the composition preferably contains no more than about 25% by weight low density polyethylene.

The polypropylene contributes to the impact resistance, and to maintain the desired impact resistance, preferably there is at least 35% polypropylene, and no more than about 50% by weight high density polyethylene.

If there is not enough high density polyethylene or too much polypropylene, the composition is too brittle. Accordingly, preferably there is at least 20% high density polyethylene and no more than about 55% polypropylene.

The preferred composition from the standpoint of impact resistance, flexibility, and brittleness contains from about 20% to about 25% by weight low density polyethylene, from about 20% to about 50% by weight high density polyethylene, and from about 35% to about 55% by weight polypropylene.

A particularly valuable feature of the present invention is that the plastic components can be recycled plastic. It is not necessary to use virgin plastic. This is particularly valuable in that it greatly reduces the cost of a plastic member according to the present invention, which allows a piling to be price competitive with wood pilings, steel pilings, and concrete pilings.

The composition contains a foaming or blowing agent in an amount of up to about 0.9% by weight to insure that when the plastic pipe is made by extruding the plastic composition into a mold, as detailed below, the mold is completely filled. Preferably the foaming agent is a chemical blowing agent such as azodicarbonamide. A suitable chemical blowing agent is available from Uniroyal of Middlebury, Conn. under the trade name Celogen AZ 130.

The composition contains an antioxidant, typically in an amount of from about 1% to about 3% by weight, and preferably a synergist for the antioxidant, the synergist being present in an amount of from about 0.001% to about 0.01% by weight. A preferred system comprises diacrylthiopropionate ester, as the antioxidant in combination with 2,6-di-t-butyl-p-creosol as the synergist. Other suitable antioxidants include propionic esther and hindered phenols.

The additives can include a coupling agent, preferably a silane. Use of a silane coupling agent improves bonding between the plastic layer/metal pipe interface and coupling between the different polymeric materials used in the plastic composition.

The plastic composition can include a fungicide, typically in an amount of about 0.25% by weight.

The plastic composition can also contain an emulsifier, in an amount of from about 0.1% to 0.3% by weight. The use of emulsifier improves surface appearance of the product.

Preferably the composition contains a filler to help reduce the cost. A preferred filler is calcium carbonate. As much filler is used as possible without adversely affecting the physical properties of the composition. Generally no more than about 11% by weight filler is used.

The composition can also contain a carbon black, generally a furnace black, as a colorant, to improve physical properties, and as a UV stabilizer. The amount of carbon black used is generally about 2.5% by weight.

To manufacture the plastic pipe 10, the various ingredients of the plastic composition are blended together to make a generally homogeneous mixture. They are then fed into an extruder and extruded around the core 12 which is positioned within a metal mold. The extruded plastic layer is allowed to cool, and contract away from the walls of the mold, and then the mold is removed.

FIG. 3 shows a setup suitable for molding the plastic pipe 10. With reference to FIG. 3, there is provided an elongated cylindrical hollow mold housing 20 having a rear end wall 22, a front end wall 24, and a side peripheral wall 26. The mold can be made of two "clam shell" segments. A gas vent 28 is provided in the side peripheral wall 26 adjacent the rear end wall 22. The front end wall 24 flares outwardly around a central opening 30 about 3 inches in diameter for coupling to an outlet of an extruder for receiving extruded plastic under pressure from the extruder.

The diameter of the mold 20 and its length are chosen depending upon the desired diameter and length of the plastic member to be formed. The core 12 of the plastic member is centrally supported in the mold housing 20. At the rear end of the housing, the core 12 is threaded through a centrally located threaded hole 44 in the rear wall 22. The front end of the core 12 is supported by a plurality of spaced apart threaded bolts 50, generally about four, that extend radially through the side peripheral wall 26. A plug 54 is placed in the front end of the core member 12 to keep plastic out of the hollow core member.

The excess plastic extruded onto the core member 12 can be removed at the end of the fabrication operation.

If desired or needed, the core member 12 and/or the housing 26 can be preheated to be certain that the extruded plastic material flows to the end wall 22 of the housing 26 and completely fills the mold.

Preferably the mold housing 26 is made of a thermally conductive, corrosion resistant material such as aluminum, so that after all the plastic is extruded, rapid cooling can be achieved, such as by means of a water bath, for optimum production rates.

It should be noted that the entire mass of the plastic layer is extruded around the core member 12 in a single extrusion operation. This is contrary to prior art techniques where a plastic sheath is wrapped around a metal core. This wrapping technique is time consuming, expensive, and craft sensitive.

The plastic pipe can be of substantially any size desired. Typically it is at least 10 feet long, and for a plastic piling, about 20 feet long. The outer diameter is generally at least about 10 inches, and preferably about 11 inches or greater. The outer diameter of the core member is no more than about 6 inches, generally no more than about 5 inches. Multiple segments can be assembled together, such as by means of a coupling member, to achieve very long pipe lengths. For example three members, each 20 feet long, have been coupled together to make a piling 60 feet long.

Elongated plastic elements according to the present invention have many uses. They can be used for plastic pilings, telephone poles, structural elements, sign posts, and light standards.

They are suitable for all these applications because these plastic members have significant advantages. In marine applications they are immune to marine borer attack, and thus require no further protection, such as creosote or plastic sheathing. They are practically maintenance free. When used as pilings they are abrasion resistant, and thus make excellent fender pilings without any added protective covering.

The plastic members 10 are chemically inert, so they can last indefinitely. They do not react with sea water, are corrosion free, are substantially immune to the effects of light, are not bothered by most petroleum products, and are not subject to dry rot. Because they can be made with recycled plastic, they are an environmentally sound investment.

Other advantages of these plastic elements is that they can be custom made, and the physical properties can be varied by varying the composition of the polymeric layer and the size and physical properties of the core. They can be relatively easy to transport and assemble. For example in marine applications, the sections can be floated to and pinned together at the job site.

For land based applications, the pilings can be made aesthetically pleasing by being produced in a variety of colors and geometric shapes. By providing the inside of the mold housing with curves or geometric patterns, a mirror image shape can be provided on the exterior of the elongated plastic element 10.

The plastic elements are able to withstand attacks from woodpeckers and sandstorms, and do not require any chemical treatment to prevent insect infestation.

In some military based naval applications, it is undesirable for a piling to be electro-magnetically sensitive. By using a non-magnetic core, plastic members according to the present invention can satisfy this need.

Figure 5:
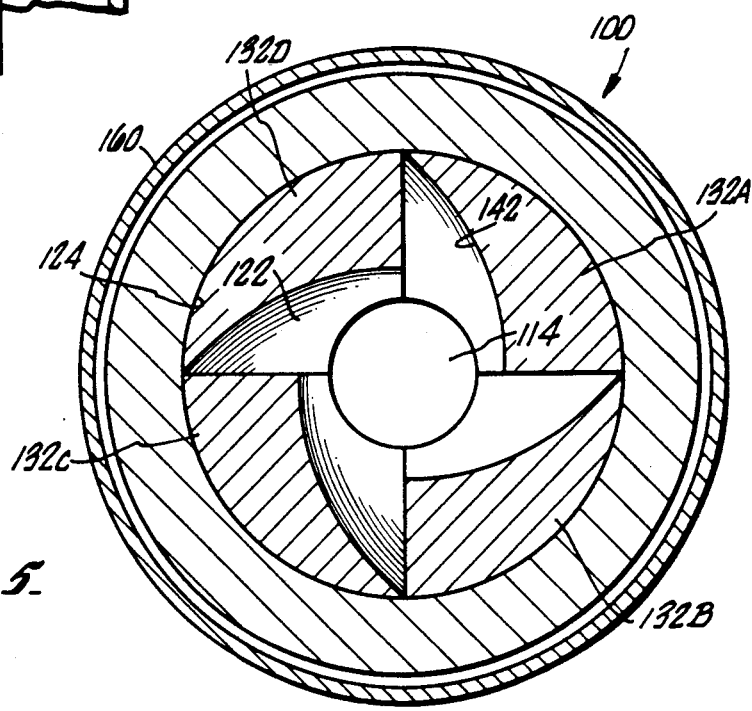
FIG. 5 is a sectional view of the die head of FIG. 4 taken along line 5—5 in FIG. 4.

FIGS. 4 and 5 show a die head 100 suitable for use with an extruder for forming plastic members according to the present invention. The die head includes a transition section 102 and a mixing section 104. The transition section 102 is adapted to receive molten thermoplastic resin from a relatively large diameter outlet 106 from an extruder, stepwise reducing the diameter of the flow path for the resin on its way to the mixing section 104. In particular, as shown in FIG. 4, 3½ inch diameter extruder outlet 106 can be reduced in a first step to a flow path 108 of about 2 inches in diameter, and then into a flow path 110 about 1½ inches in diameter, the size of the entrance 112 into the transition section 104.

The transition section 104 includes an outlet 114 for feeding thermoplastic resin into the mold housing 20. The diameter of the outlet 114 is larger than the diameter of the entrance 112 to prevent resin from being pressured back into the transition section.

The mixing section 104 includes a longitudinally extending mixing chamber 122 having a peripheral wall 124. The mixing chamber 122 has a central region 126 having a diameter larger than the diameter of the entrance 112 and the outlet 114. The mixing chamber 122 is generally ellipsoidal in shape, and preferably is prolate ellipsoidal in shape.

The mixing section 104 includes a plurality of longitudinally extending vanes 132 projection radially inwardly from the peripheral wall 124. These vanes serve to impart rotational motion to the resin passing through the mixing section. The distance each vane projects inwardly varies along the length of the mixing chamber 122, being at maximum at the central region 126 and at minimum at the entrance 112 and the exit 114 from the mixing chamber. However, because of the ellipsoidal shape of the mixing chamber, the distance between the radially inward edge 142 of each vane 132 and the central longitudinal axis 144 of the mixing chamber 122 is relatively constant along the length of the mixing chamber, being at a maximum in the central region 126 of the mixing chamber 122.

The distance the vanes 132 project inwardly into the mixing chamber varies along the peripheral wall 124 of the mixing chamber. As shown in FIG. 5, there can be four vanes 132, each occupying a 90° segment in the mixing chamber. For example, the first vane 132A can extend from the 12 o'clock to 3 o'clock position, and the second vane 132B can extend from the 3 o'clock to 6 o'clock position, the third vane 132C can extend from the 6 o'clock to the 9 o'clock position, and the fourth vane 132D can extend from the 9 o'clock to 12 o'clock position. The amount each vane projects radially into the mixing chamber continuously increases clockwise, so that for example, the first vane 132A projects out at maximum at the 3 o'clock position, reducing to an extension about 0 at the 12 o'clock position.

Because of the configuration of the vanes, the rotational movement is imparted to the resin in the mixing chamber as the resin passes therethrough on its way to the mold 112. Generally, there is no significant loss of pressure in the mixing chamber. The resin is discharged from the extruder at a pressure greater than 5000 psi, and typically from 8000 to 9000 psi into the die head, and is still at about the same pressure in the mixing chamber.

It is necessary to maintain the resin molten in the mixing chamber. For this purpose band heaters 160 are provided along the peripheral wall of the die head 100. For example, when the foaming agent used is celogen A2 130 from Uniroyal, it is desirable to maintain the composition at a temperature of about 430° F. At this temperature the preferred thermoplastic composition is easily extruded without degrading the foaming agent. This temperature can be maintained in the die head through the use of the band heaters 160.

Figure 6:
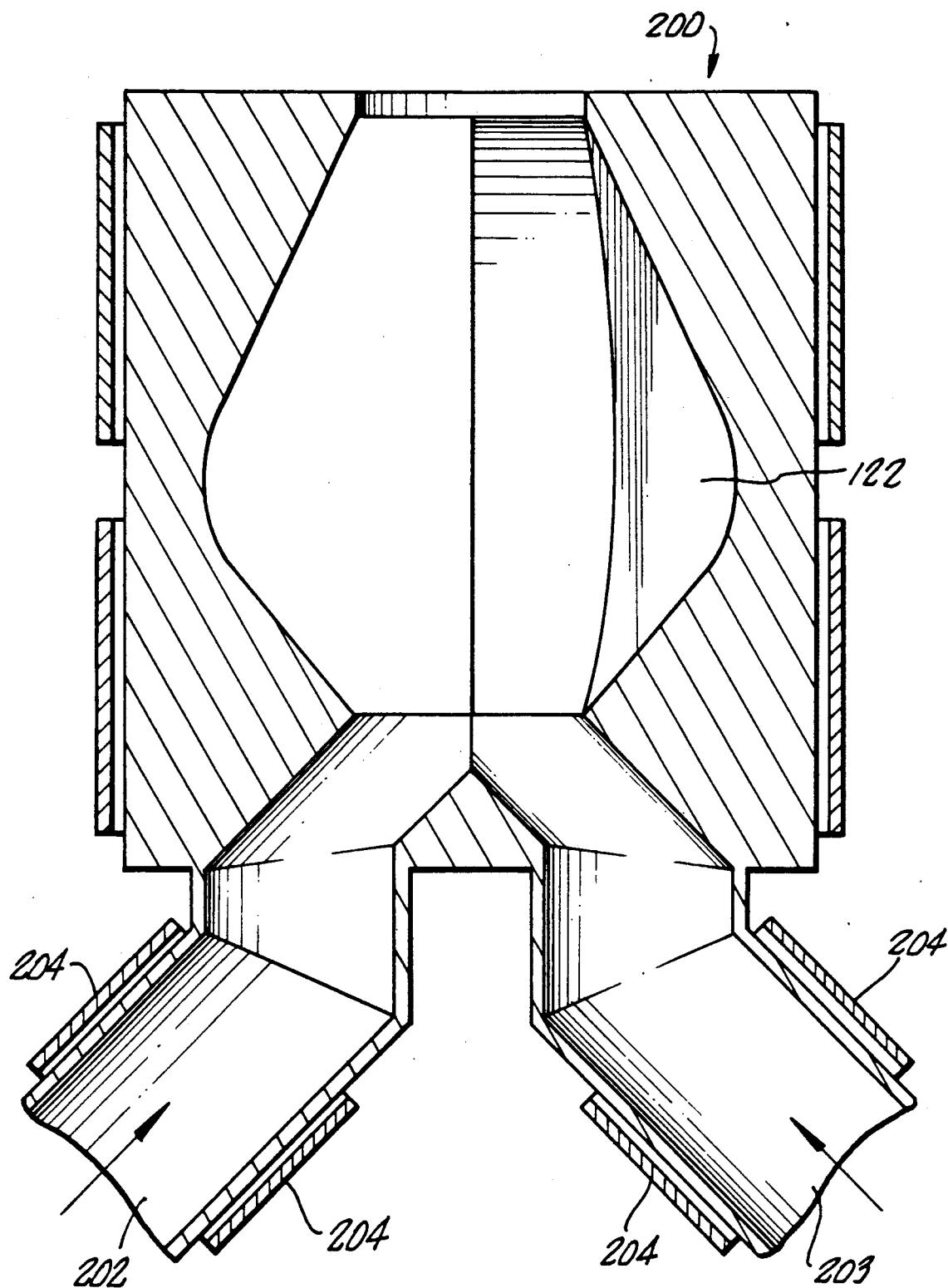
FIG. 6 is a longitudinal sectional view of another die head for use with two extruders for forming plastic members in accordance with the present invention.

FIG. 6 shows a die head 200 suitable for making plastic members according to the present invention. This die head differs from the die head of FIGS. 4 and 5 in that it is provided with two inlets 202 and 203 so that the plastic material from two extruders can be received simultaneously. Each inlet 202 and 203 is provided with band heaters 204 for maintaining the plastic at an elevated temperature. In FIG. 6, the same reference numbers are used as in FIGS. 4 and 5 to refer to items that are similar.

These and other features of the present invention are demonstrated by the following example:

EXAMPLE

A dry blend of a polymeric composition as identified in Table 1 was prepared. The polymeric components of the composition were all recycled plastic. This material was fed to a pair of extruders having in combination 150 horsepower (first extruder of 100 horsepower and second extruder of 50 horsepower), and fed from the extruders through a die head as shown in FIG. 6 into the assembly shown in FIG. 3. The extruder temperature was maintained at about 430° F. to prevent degradation of the blowing agent, and the pressure in the extruder and die head was about 9000 psi. The inlets from the extruder were 2¼ inches in diameter, and the outlet from the die head into the mold was 3 inches in diameter. The core element 12 was a 20 foot long steel pipe having a nominal outer diameter of 5 inches and a wall thickness of about ¼ inch. The inner diameter of the mold housing was about 13 inches. It was necessary to extrude about 700 pounds of the plastic composition of Table 1 into the mold. It took about 50 minutes to accomplish this. The core element was preheated to about 80° C.

After extrusion the mold and formed plastic pipe were placed into a water bath for cooling for about 2 hours. The plastic member was then removed from the housing. Excess plastic material from the front end was cut away.

This plastic member was joined to two other substantially identical members and has been tested for about two years in Los Angeles Harbor as a piling. It was installed using conventional pile driving equipment. The piling has been subjected to numerous docking operations, mostly by large capacity fuel barges. To date the piling is performing well.

TABLE I

| Plastic Composition | Wt %[1] |
|---|---|
| Polymeric Elements | |
| Low density polyethylene | 20 |
| High density polyethylene | 40 |
| Polypropylene | 40 |
| | 100 |
| Additives | |
| Furnace carbon black | 2.5 |
| Calcium carbonate filler[2] | 11.0 |
| Foaming agent[3] | 0.7 |
| Fungicide | 0.25 |
| Silane coupling agent[4] | 1.0 |
| Emulsifier[5] | 0.2 |
| Antioxidant (Diacryl-thiodi-propionate-ester)[6] | 0.6 |
| Synergist[7] | 0.005 |

[1] Based on total weight of the polymeric elements.
[2] From Pfizer, 0.07 micron particle size, trade name PCC
[3] Celogen A2 130 from Uniroyal.
[4] From Petrarch Systems, Inc., Catalog C-T-2095
[5] Trade name tecquinol hydroquinone from Kodak
[6] From B. F. Goodrich under trade name Goodrite 3125
[7] 2,6-di-t-butyl-P-creosol More than about 85,000 pounds of force were required to overcome the adhesion between the plastic layer 14 and the core element 12.

Although the present invention has been described in considerable detail with reference to certain versions thereof, other versions are possible. Therefore the spirit and scope of the appended claims should not be limited to the description of the preferred versions contained herein.

What is claimed is:

1. An elongated structural plastic member having an outer diameter of at least 10 inches and an integral core, and suitable for use as a plastic piling, the member being at least 10 feet long and comprising:
   (a) an inner elongated core of at least about 3 inches in diameter; and
   (b) an outer, extruded, continuous, substantially homogenous plastic layer at least 2 inches thick on substantially the entire length of the core, the plastic layer comprising low density polyethylene, high density polyethylene, polypropylene, foaming agent, and antioxidant,
   wherein the plastic layer comprises, based on the weight of the plastic components of the layer, from about 20% to about 25% by weight low density polyethylene, from about 20% to about 50% by weight high density polyethylene, and from about 35% to about 55% by weight polypropylene.

2. The member of claim 1 wherein the plastic layer is at least 3 inches thick and the core is no more than 5 inches in diameter.

3. The pipe of claim 1 in which the plastic layer comprises, based upon the weight of the plastic components of the layer, about 20% by weight low density polyethylene, about 40% by weight high density polyethylene, and about 40% by weight polypropylene.

4. The pipe of claim 1 in which the plastic layer comprises filler.

5. The pipe of claim 4 in which the filler is calcium carbonate.

6. The pipe of claim 1 in which the plastic layer weighs at least 500 pounds.

7. The pipe of claim 1 in which one or both ends of the core extend out from the plastic layer for joining two or more plastic members together.

8. A structural plastic pipe having an outer diameter of at least 10 inches and suitable for use as a plastic piling, the pipe being at least 10 feet long, the pipe comprising:
 (a) an inner pipe core of at least 3 inches in diameter; and
 (b) an outer, extruded, continuous, substantially homogeneous plastic layer at least about 3 inches thick on substantially the entire length of the pipe core, the plastic layer comprising, based on the weight of the plastic components of the layer, from about 20% to about 25% by weight low density polyethylene, from about 20% to about 50% by weight high density polyethylene, from about 35% to about 55% by weight polypropylene, foaming agent, antioxidant, and filler.

* * * * *